Dec. 23, 1958 M. S. CARMICHAEL, JR 2,865,378
CROP HULLING APPARATUS
Original Filed June 18, 1953 3 Sheets-Sheet 1

INVENTOR.
MEAD S. CARMICHAEL JR.
BY Schmieding and Fultz
ATTORNEYS

Dec. 23, 1958 M. S. CARMICHAEL, JR 2,865,378
CROP HULLING APPARATUS
Original Filed June 18, 1953 3 Sheets-Sheet 2
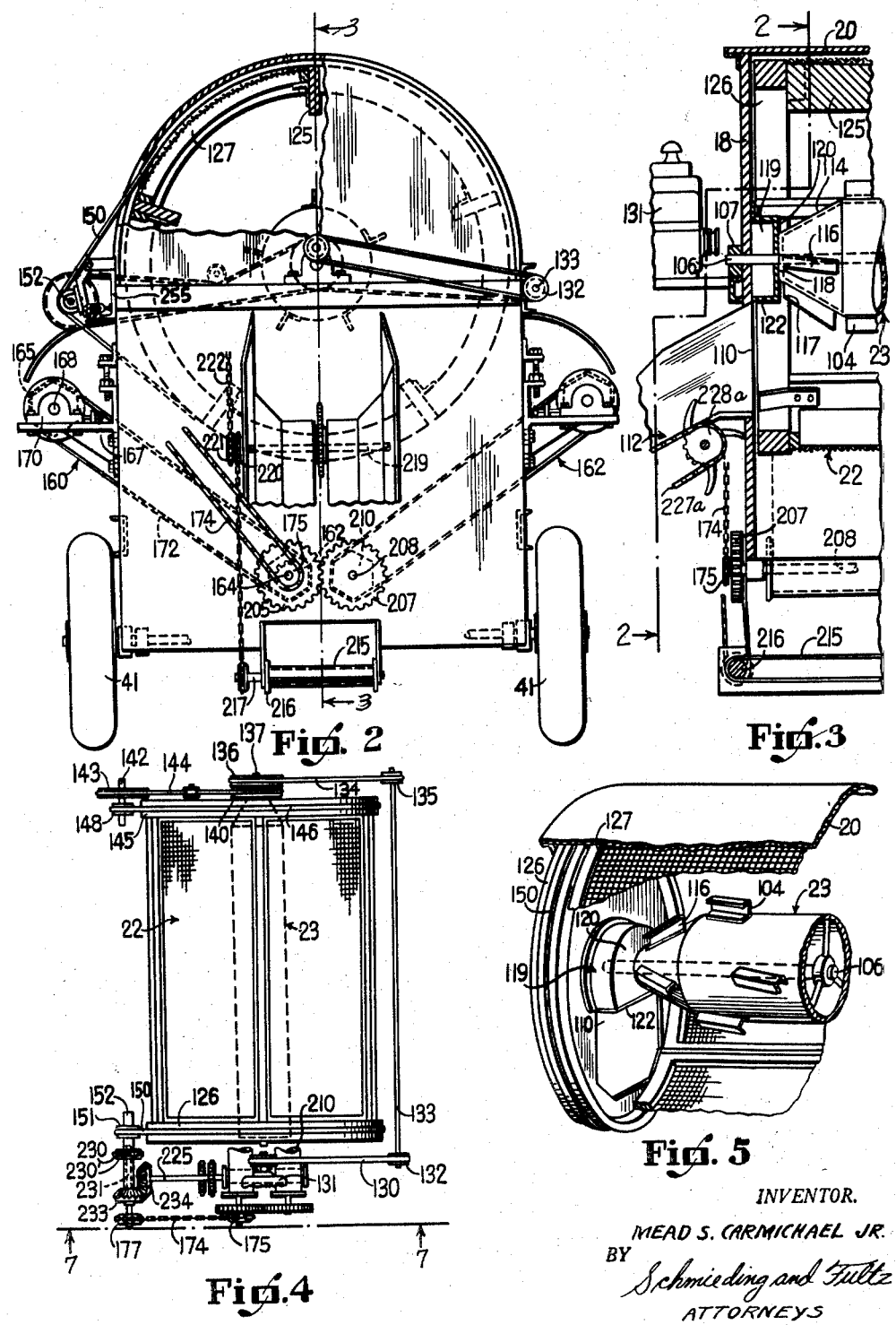
INVENTOR.
MEAD S. CARMICHAEL JR.
BY
Schmieding and Fultz
ATTORNEYS Dec. 23, 1958   M. S. CARMICHAEL, JR   2,865,378
CROP HULLING APPARATUS Original Filed June 18, 1953   3 Sheets-Sheet 3

INVENTOR.
MEAD S. CARMICHAEL JR.
BY Schmieding and Fultz
ATTORNEYS

United States Patent Office 2,865,378
Patented Dec. 23, 1958

2,865,378

CROP HULLING APPARATUS

Mead S. Carmichael, Jr., Columbus, Ohio, assignor to The Scott Viner Company, Columbus, Ohio, a corporation of Ohio Original application June 18, 1953, Serial No. 362,459. Divided and this application September 6, 1955, Serial No. 532,444

1 Claim. (Cl. 130—30)

The present invention relates to an improved harvester and, more particularly to a viner for separating peas, beans, or similar products from the vines and pods.

The present invention is particularly adaptable to viners operating on the impact principle wherein the vines are fed into the end of a rotating screen covered drum. A beater cylinder is rotated within the screen covered drum, and a series of beaters are mounted on the outer periphery of the beater cylinder. When the beaters strike the pods, such pods are opened by impact and the crop, such as peas, or beans, falls downwardly through the screen covered drum to the surface of a separating apron, or inclined conveyor. The crop will then roll downwardly to a collecting means and the small particles of vines and pods will be carried upwardly by the conveyor so as to be separated from the crop.

This application is a division of my co-pending application Serial Number 362,459, filed June 18, 1953.

An object of the present invention is to provide a viner of relatively light weight and small size, as compared to former viners' structures, without sacrificing the production capacity obtained by the former larger viner structures. Such increased production rate, for a given viner size, results from the present novel configuration of the forward end of the beater cylinder, and from the provision of novel beaters on such forward end. Such novel beater cylinder arrangement makes possible the building of a viner of relatively small overall size, since the intake opening for the vines and pods can be of relatively small diameter without sacrificing the intake capacity of the intake opening. As a further result, the rotatable screen drum, the viner frame, and other portions of the viner structure can be made correspondingly smaller.

Further objects and advantages of the present invention will be apparent from the following description, reference being had to the accompanying drawings wherein a preferred form of embodiment of the invention is clearly shown.

In the drawing:

Figure 2 is a front view, partially in section, of the viner of the present invention, with the section being taken along the line 2—2 of Figure 3;

Figure 3 is a partial side sectional view of the viner of the present invention with the section being taken substantially along 3—3 of Figure 2;

Figure 4 is a partial top view of the viner of the present invention;

Figure 5 is a partial perspective view showing the front portion of a beater cylinder utilized in the viner of Figure 1;

Figure 1:
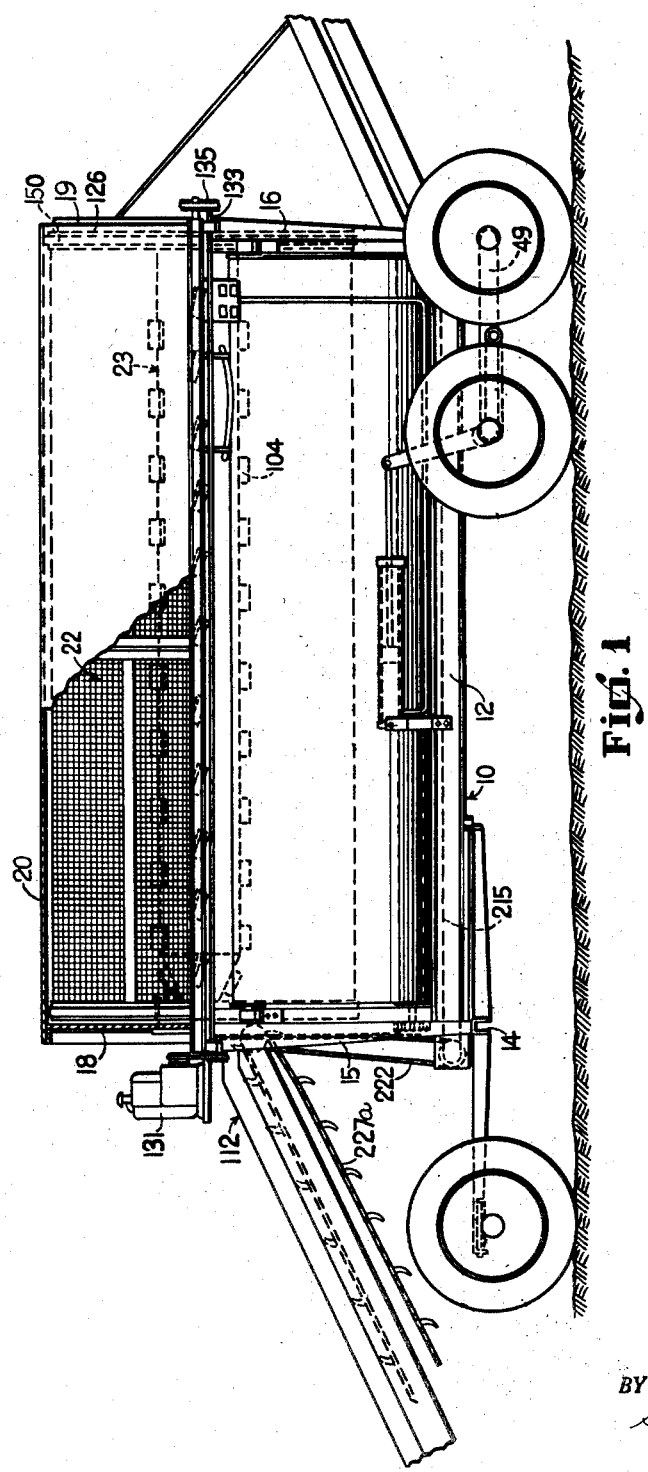
Figure 1 is a side view of a viner embodying the present invention.

Referring to Fig. 1, a side view of a viner is shown having a frame indicated generally at 10. The frame includes longitudinally extending side members 12, which, at their forward and rearward ends, are connected by transverse bars 14. Two vertical frame members 15 are disposed at the forward end of the frame, and similar vertical members 16 are disposed at the rearward end of the frame. The frame supports a forward wall 18, a rearward wall 19, and an arcuately shaped cover 20.

Within the closure members just mentioned, a screen drum 22 is rotatably mounted on the frame 10. A rotatable beater drum 23 is mounted, to the frame 10, and within the screen drum 22 for co-axial rotation therewith.

Figure 6:
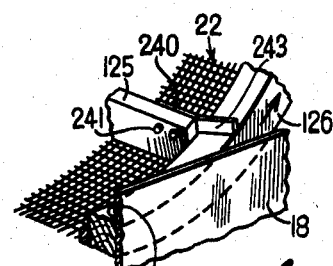
Figure 6 is a partial perspective view of a screen drum construction for the viner of Figure 1.
Figure 7:
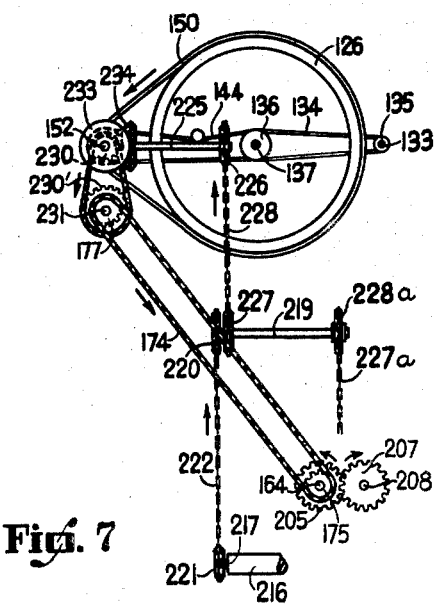
Figure 7 is a schematic view of a driving means for the apparatus of the present invention.

Considering next the construction of the beater cylinder, reference is made to Figs. 1, 6, and 8 wherein the longitudinally extending beater cylinder is indicated generally at 23, with such beater cylinder being provided with a plurality of beaters 104 mounted at spaced intervals along the length thereof. The beater cylinder 23 is mounted for rotation by stub shafts at either end thereof one of which is shown at 106 in Fig. 6. Stub shaft 106 is journaled in a simple bearing means 107 which is mounted on the forward wall 18. Inside the confines of the forward wall 18 and the cover 20, a rotatable screen drum 22 is mounted for coaxial rotation with the beater cylinder 23.

For conveying vines into the forward end of the screen drum 22, an opening 110 is provided in the forward wall 18 and a pickup mechanism 112 serves to convey vines upwardly, and through the opening 110 into the screen drum 22. In order to admit a large volume of vines into the screen drum 22, it is necessary to have the opening 110, in the front wall 18, as large as possible since the capacity of vine intake for the machine is governed by the size of opening 110. The size of the opening 110, can obviously be increased by increasing the diameter of the screen drum 22, but such increase in diameter of the screen drum is undesirable since the overall size and weight of the viner are thereby increased, resulting in a viner that is expensive to construct and operate as well as being cumbersome and unwieldy in harvesting operations.

It has been discovered, according to the present invention that the size of the intake opening 110, and hence the intake capacity of the viner, can be increased by providing a tapered portion 114 on the forward end of the beater cylinder 102. Such forward tapered portion 114 is provided with angularly disposed beaters 116 which draw the vines inwardly through opening 110 at a high rate of vine intake.

It should be particularly noted, at this point, that it is unsatisfactory to reduce the diameter of the conventional beater cylinder 23 throughout its axial length, for the purpose of increasing the size of its vine intake opening to produce a small viner that still has a high intake capacity. If the diameter of the beater cylinder is made unduly small, vines will become wrapped thereon and clogging of the machine occurs. Hence, according to present invention, the diameter of the beater cylinder 23 is maintained sufficiently great to avoid intertwining of the vines thereon, and the forward end portion 114 is tapered, as seen in Figures 6 and 8, to permit the use of a relatively large intake opening as is seen at 110. Moreover, the angularly mounted beaters 116 are provided on the nose section 114 for drawing the vines inwardly and for conveying the vines rapidly rearwardly to the beaters 104.

The tapered portion 114, of the beater cylinder 23, is formed with a squared off end 118 (see Fig. 3), with such end 118 being contiguous with a guard pan 119 mounted to the inner surface of the forward wall 18. Guard pan 119 surrounds stub shaft 106 and prevents the intertwining of vines around such shaft. Guard pan 119 has a face portion 120 in close abutting relationship with the end 118 of the tapered section 114. The lower edge 122, of the guard pan 119, extends downwardly to a point substantially in a line with a circular path of outer forward edges 117 of beaters 116 substantially as shown in Figures 6 and 8.

In Figures 2 and 3 it will be seen that the screen drum 22 is provided with a plurality of longitudinally extending beaters 125 having their ends bolted to ring shaped drum ends 126 and 145. Curved screen panels 127 are removably mounted between the screen drum beaters 125.

Attention is now directed to Figures 1, 2, 4, and 7 where the driving arrangement for the screen drum 22 and the beater cylinder 23 is shown. A prime mover 131 is mounted to the forward end of the viner frame. Prime mover 131 drives a shaft 133 by a belt 130 and a pulley 132.

Referring next to the rear of the viner, it will be seen that the shaft 133 serves to drive the beater cylinder 23 by the belt 134 which extends between a pulley 135, on shaft 133, and a pulley 136 on a rear stub shaft 137, which stub shaft extends rigidly into the rear end of the beater cylinder 23.

For the purpose of driving the screen drum 22, a second pulley 140, on stub shaft 137, serves to drive a jack shaft 142 and pulley 143 by a belt 144. The rear drum end 145 of the screen drum 22, is grooved for receiving a belt 146, which belt drives the screen drum 22 by a pulley 148 mounted on the shaft 142. Referring now to the forward end of the viner, in Figure 7, it will be seen that the forward drum end 126 of the screen, drum 22, is grooved for receiving the belt 150, which belt drives a pulley 151 to in turn drive a jack shaft 152. Jack shaft 152 serves as a power takeoff for driving a pair of separating aprons, a front end feeder for picking up vines, and a collecting conveyor for hulled crop.

A left separating apron is indicated generally at 160 and a right separating apron is indicated generally at 162. Referring to the left separating apron 160, for the convenience of description it will be seen that such mechanism comprises a hexagonally shaped apron drum 163 which is rotatably mounted to the frame on shaft 164. The mechanism further comprises a second hexagonally shaped apron drum 165 which is mounted to a bracket 167 by shaft 168, the latter being journaled in a bearing block 170. An endless conveyor belt 172, fabricated from canvas or the like, extends around the hexagonal apron drums 163 and 165. The conveyor belt 173 is driven in a counter-clockwise direction by a sprocket 175, which latter is mounted on the apron drum shaft 164, a sprocket 177, mounted on a shaft 231, and a chain 174 which drivingly engages such sprockets. Shaft 231 in turn is driven from stub shaft 152 by sprockets 235 and 230.

A gear 205 is mounted on shaft 164 and drives a similar gear 207 which is mounted on shaft 208 of a lower right hexagonal conveyor drum 210. The hexagonal conveyor drum 210 is arranged parallelly with, but spaced from the left conveyor drum 163. The conveyor drums 163 and 210 are spaced so that the crop, rolling down the incline of the surfaces of the conveyor belts, will fall downwardly upon the crop collecting conveyor. Such crop collecting conveyor extends longitudinally rearwardly below and spaced between the apron that comprises conveyor belt 215 and rollers 216. A shaft 217 is fastened to one of the rollers 216 for driving conveyor belt 215, the top of the conveyor belt 215 moving rearwardly. The shaft 217 is driven from a jackshaft 219 by sprockets 220 and 221, and chain 222. Jackshaft 219, in turn, is driven by a second jackshaft 225, the sprockets 226 and 227, and chain 228. Jackshaft 219 also serves to drive the vine pickup chain 227a by a sprocket 228a. Such pickup chain 227a comprises part of the vine pickup mechanism indicated generally as 112. Jackshaft 225 is driven from the jackshaft 152 by a pair of bevelled gears 233 and 234.

Referring next to Figure 6, the forward ring-shaped screen drum end 126 is shown in detailed perspective. Angular bracket members 240 are bolted to the screen drum beater members 125 by the bolts 241. Each bracket 240 is provided with a blade portion 243 which extends angularly across the inner surface 222 of the screen drum end 126. Such blade portions 243 prevent the build up of particles of vines and pods on the inner surface 244 of front wall 18. The blade portions also help draw vines inwardly through the opening 110.

It will further be seen that the present invention provides a novel and unobvious combination of structure for the vine intake operation which occurs at the forward end of the screen drum and beater cylinder. Meritorious functional results are achieved since the vine intake capacity is increased for a viner of any given size, and, moreover, smaller, lighter, less expensive viners are thereby made possible.

While the form of embodiment of the present invention as herein disclosed constitutes a preferred form, it is to be understood that other forms might be adopted, all coming within the scope of the claim which follows:

I claim:

An improved viner, or the like, of the type wherein the crop and stalks are fed into a rotatable drum having a rotatable beater cylinder mounted therein, the improvement comprising, in combination, a beater cylinder mounted on a stub shaft extending axially therethrough for rotation of said cylinder and including a main cylindrical portion and an inwardly tapered front nose portion; a rotatable drum surrounding the beater cylinder and having an open forward end; a stationary closure wall for said open end of the drum and receiving one end of said stub shaft, said closure wall having a crop intake opening centrally positioned in the lower portion thereof, said front nose portion of said beater cylinder being spaced rearwardly of said intake opening; a guard pan secured to the inner surface of said stationary closure means to cover the upper portion of said intake opening, said guard pan extending rearwardly from said opening and having a back face in abutting relationship with the forward end of said nose portion and surrounding said stub shaft, and a plurality of beaters angularly mounted on the nose portion of said beater cylinder and extending substantially the length thereof.

References Cited in the file of this patent

UNITED STATES PATENTS

| | | |
|---|---|---|
| 234,599 | McClung | Nov. 16, 1880 |
| 1,153,304 | Hamachek | Sept. 14, 1915 |
| 1,257,058 | Williams | Feb. 19, 1918 |
| 1,405,914 | Hamachek | Feb. 7, 1922 |